June 28, 1927.

S. S. MATTHES

CONDUCTOR SUPPORT

Filed Sept. 2, 1925

1,633,867

Inventor
Samuel S. Matthes

By

Attorney

Patented June 28, 1927.

1,633,867

UNITED STATES PATENT OFFICE.

SAMUEL S. MATTHES, OF MANSFIELD, OHIO, ASSIGNOR TO THE OHIO BRASS COMPANY, OF MANSFIELD, OHIO, A CORPORATION OF NEW JERSEY.

CONDUCTOR SUPPORT.

Application filed September 2, 1925. Serial No. 54,013.

My invention relates to conductor supports and particularly to a support in which the conductor, which may be a trolley wire, is gripped and supported from an auxiliary wire which may be of copper or steel, depending upon whether the auxiliary wire is to act as a feeder for the conductor or trolley wire.

The object of my invention is to provide a simple and efficient unitary device for supporting a conductor from an auxiliary cable or conductor, and as I have shown the conductor to be a trolley wire I will describe my invention as applied to a trolley wire.

My invention resides in the new and novel construction, combination and relation of the various parts herein described and shown in the accompanying drawing.

Figure 4:
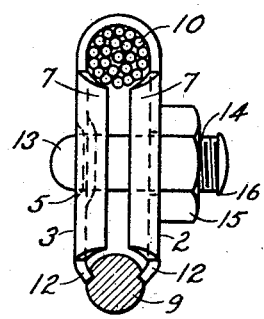
Fig. 4 is an end view of my invention shown as installed upon a trolley wire and its supporting cable.
Figure 3:
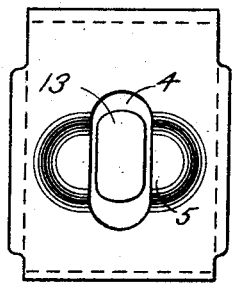
Fig. 3 is a side view of my invention taken on the line 3—3 of Fig. 2.

In the preferred embodiment of my invention I employ a body member 1, which is a single piece of metal preferably of rolled sheet copper, bronze or steel, or it may be of cast metal. The body member is stamped out of the sheets and of the metal desired and to proper shape and is then formed to the shape shown in Fig. 2 and has two side members 2 and 3. The member 3 is formed with a vertical opening 4 and at right angles thereto is formed with a depression 5 of substantially the same size and shape as the opening 4. The member 2 is provided with an opening 6 which registers with the opening 4 and centrally thereof when the members 2 and 3 are formed to position as shown in Fig. 4.

The members 2 and 3 are formed with inwardly turned edges 7. The body member 1 is also provided with a rectangular slot 8 which is shown as being disposed wholly within the member 2. This slot may be of various shapes and sizes or may be a series of spaced holes across the member 2 and its function is to produce a weakening of the body member 1 at this point in order that the member 1 will bend at this point when the members 2 and 3 are moved together into clamping relation with the conductor 9.

I have found that if the slot 8 or its equivalent is positioned centrally of the body member 1 so as to be positioned at the point A that when the members 2 and 3 are moved together to grip the conductor 9 that the members 2 and 3 may not be symmetrically positioned with respect to the trolley wire 9 as one member may bend differently from that of the other member, but I have found that when the slot 8 was placed to one side of the point A that this difficulty was entirely overcome.

There is also an advantage in having the body weaken to one side of the point A as this then gives practically solid metal at the curved portion of the body member which rests upon the supporting conductor 10. In other words, the member 3 at the upper part is not weakened at all on account of the slot 8 and if for any reason the side members 11 should become broken the weight will all be taken by a full section of the metal at the point A.

The lower edges of the members 2 and 3 are provided with lips 12 adapted to engage the groove in the trolley wire 9. The body member is provided with a T headed bolt 13 and a threaded shank 14, which is inserted in the opening 6 and after the nut 15 is positioned the outer end of the shank 14 is upset, as at 16, to prevent the complete removal of the nut. The T head 13 is adapted to pass through the opening 4 when the members 2 and 3 are brought together and when rotated ninety degrees the head will coincide with and rest within the depression or pocket 5.

The upper faces of the inwardly turned flanges 7 are arranged to interlock with the cable 10 on its underside thereby preventing an upward movement of the clamp with respect to the cable 10. By this construction of the edge 7 of the clamp if the clamp tends to fit the cable 10 somewhat loosely then the clamp is prevented from vertical relative movement with the cable 10 through the engagement of the upper faces of the inwardly turned edges 7 with the cable.

Figure 1:
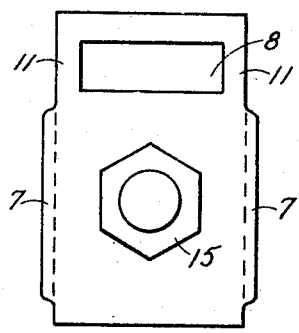
Fig. 1 is a side view of my invention taken along the line 1—1 of Fig. 2.
Figure 2:
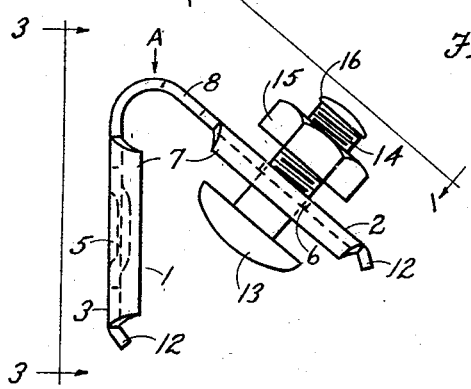
Fig. 2 is an end view of my invention showing the parts prior to installation upon a trolley wire and the supporting cable.

In installing my invention upon a supporting cable and trolley wire the device as shown in Fig. 2 is first positioned upon the cable 10 and then the member 2 pressed inwardly at its lower edge and the lips 12 brought into engagement with the grooves in the trolley wire 9. While in this position the T head of the bolt is passed through the opening 4 and rotated ninety degrees and the nut 15 then run up into position thereby holding the members 2 and 3 against any tendency to open and by the application of a wrench to the nut 15 the grip upon the trolley wire 9 and cable 10 can be made anything desired.

It will be readily seen, as already stated, that if the members 11 should for any reason break that the upper portion of the member 3 being solid and hooked over the cable 10 and the member 2 being held in position by means of the bolt and nut that the device will still securely hold the trolley wire 9 supported from the cable 10, but this would not be true if the slot 11 was positioned central of the body member 1.

It will also be evident that with the arrangement of the fastening bolt and nut that I have produced a unitary device in which it is unnecessary to remove the bolt and nut from the member 1 in either installing upon or removing the device from a cable or conductor.

There are modifications which may be made and which will be apparent to those skilled in the art, but I wish to be limited only by my claims.

I claim—

1. A suspension clamp for a conductor comprising a unitary body member bent midway its length to form sides with the opposite edges adjacent to grip the conductor, registering transverse passages through the sides, fastening means positioned within the passages to draw the gripping edges into and maintain them in engagement with the conductor and a weakened portion adjacent and to one side of the center of the bight to permit one side of the clamp to move relative to the other side and the edge thereof into engagement with the conductor.

2. A suspension clamp for a conductor comprising a unitary body member normally having a U shaped formation with the legs angularly disposed, means on the extreme edges to engage and grip the conductor, means to hold the gripping means in engagement with the conductor and a reduced portion positioned to one side of the center line of the bight to permit that leg to move relative to the other leg and into engagement with the conductor.

3. A suspension clamp for a conductor, a unitary body member having a U shaped formation, means on oppositely disposed edges to engage and grip the conductor, means to hold the edges in engagement with the conductor and the body member having a portion of reduced cross-section to one side of the center of the bight to permit one leg of the body member to move relative to the other leg and into engagement with the conductor.

4. A suspension clamp comprising a unitary body member having a U shaped formation and means to one side of the center line of the bight to permit one leg of the body member to move relative to the other leg and into engagement with a conductor, oppositely disposed means on the legs to engage the conductor, registering openings in the legs to receive a T headed bolt, the opening in one leg being shaped to receive the T head therethrough and permit the head being rotated ninety degrees therefrom to engage the leg to permit the bolt drawing the legs into engagement with the conductor.

5. A suspension device for a trolley wire comprising a pair of clamping jaws integrally united along one edge and having means at the opposite edges to grip a conductor, means passing through the jaws to maintain the jaws in clamping engagement with the conductor, the said means having an upset head to engage with or be disengaged from one jaw by a rotative movement and a reduced portion on one jaw adjacent the union with the other jaw to permit one jaw to bend more freely than the other into engagement with the conductor.

6. A suspension device to engage a pair of spaced parallel wires comprising a unitary U shaped body member adapted to receive one wire in the bight and having engaging means at the opposite ends to grip the other wire, means to engage the legs of the body member to hold the engaging means in clamped relation to the said other wire and means on the side edges of the legs of the device to engage and hold the first wire in fixed and predetermined spaced relation to the second said wire.

7. A suspension device to engage a pair of spaced parallel wires comprising a unitary U shaped body member adapted to receive one wire in the bight and having engaging means at the opposite ends to grip the other wire, means to engage the legs of the body member to hold the engaging means in clamped relation to the said wire and means to engage the first wire on the side opposite to that engaged by the bight to prevent movement of the device relative to the first wire.

8. A suspension device to engage a pair of spaced and parallel wires comprising a clamping member having a lip at one edge to engage one wire and a bent over portion at the opposite end to engage the other wire and support the member thereon, a second clamping member secured to the bent over portion of the first member by reduced sections of material to permit the second member to move relative to the first member, a lip on the second member to engage the second wire and means to engage both members and disengage one member by rotation to hold the lip in engagement with the second wire.

9. A trolley wire clamp comprising a U-shaped member consisting of a pair of integrally united clamping jaws, clamping means for maintaining the jaws in clamping relation on the trolley wire, means on one jaw to interlock with the other jaw when the clamping means is angularly rotated and one jaw having a reduced cross-section on one jaw adjacent the bight to compel said jaw to move relative to the other jaw when force is applied thereto.

10. A conductor support comprising a U shaped member consisting of a pair of legs integrally connected by a bight, means at one edge of each leg opposite the bight to engage the conductor, means to engage each leg to hold the legs in engageable relation to the conductor and an opening in one leg adjacent the bight to reduce the cross-section of the leg to permit it to bend at the point of opening.

In testimony whereof I affix my signature.

SAMUEL S. MATTHES.